United States Patent [19]

Meyers, Jr.

[11] Patent Number: 4,642,737
[45] Date of Patent: Feb. 10, 1987

[54] MOTOR VEHICLE HEADLIGHT INDICATOR

[76] Inventor: George N. Meyers, Jr., 5418 21st West, Bradenton, Fla. 33507

[21] Appl. No.: 751,233

[22] Filed: Jul. 2, 1985

[51] Int. Cl.⁴ .............................................. B60Q 1/00
[52] U.S. Cl. ........................................ 362/61; 362/32; 362/397; 362/26
[58] Field of Search ....................... 362/61, 32, 80, 26, 362/397; 116/28 R, 202

[56] References Cited

U.S. PATENT DOCUMENTS 2,481,321 9/1949 Marcinik ........................... 116/28 R
2,738,755 3/1956 Doane .................................... 362/26

Primary Examiner—E. Rollins Cross
Attorney, Agent, or Firm—Charles J. Prescott; Raymond H. Quist

[57] ABSTRACT

A suction cup is used to attach one end of a light conveying conduit to the headlight (or other light) of a motor vehicle while the other end of the conduit is positioned in the field of view of the operator of the motor vehicle. The conduit may be rigid with the one end held in a recess in the center of the suction cup. A flexible conduit may also be used with the other end of the conduit held in the field of view by a second suction cup.

11 Claims, 5 Drawing Figures

MOTOR VEHICLE HEADLIGHT INDICATOR

BACKGROUND OF THE INVENTION

1. Field of the Invention

This invention relates generally to a headlight indicator for a motor vehicle, and more particularly to a headlight indicator which will provide visual proof that a motor vehicle headlight is lit even in the daytime.

2. Description of the Prior Art

In many areas the law requires, and elsewhere prudence dictates, that a motorcycle headlight should be lit whenever the vehicle is operated. When it is dark the beam of the headlight is readily visible to the operator, but in the daytime it is difficult for the operator to determine whether the headlight is switched on, or even if it is switched on, whether it is operating. Many motorcycle operators have developed the habit of leaning forward to place their hand in front of the headlight for a visual indication of its operation. It is evident that this habit causes the operator to move into a position not contemplated in the design of the motorcycle and one which is awkward if not hazardous.

Automobiles have had visual indicators for the operation of lights such as turn signals in the passenger compartment and on the top of the fenders. Such visual indicators have been installed in the vehicle when it was constructed and are not readily installed on existing vehicles as a modification or improvement. When automobile headlights are used during the day, for safety or because of inclement weather, the operator may have no visible indication that the lights are on, and so park the car leaving the lights on. Even at night, when the automobile is equipped with two or more headlights, it is difficult to discern that one headlight is not working so that replacement of a nonoperative headlight may be unduly delayed.

Other motor vehicles such as snowmobiles or the like have headlights which may be lit during the day, but visible evidence that the headlights are lit is not available on the vehicles.

It is therefore an object of this invention to provide a motor vehicle headlight indicator which will provide to the operator a visual indication of the operation of the headlight.

It is a further object of this invention to provide a motor vehicle headlight indicator which can be installed without the use of tools or the need for modifying the motor vehicle in any respect.

It is also an object of this invention to provide a motor vehicle headlight indicator which is so inexpensive that cost will not deter its use.

SUMMARY OF THE INVENTION

A light conveying conduit is configured, by bending or curving, to have one end in the field of view of the operator of a motor vehicle while the other end is facing the beam of the headlight. A suction cup is used to secure the conduit, which may be rigid or flexible, on the headlight. In a preferred embodiment, the suction cup is of transparent material and one end of the conduit is secured in the center of the suction cup. This embodiment is secured directly on the lens of the headlight. An alternate embodiment has the side of the conduit secured to the suction cup so that the suction cup may be secured to the headlight housing.

DESCRIPTION OF THE PREFERRED EMBODIMENT

Figure 1:
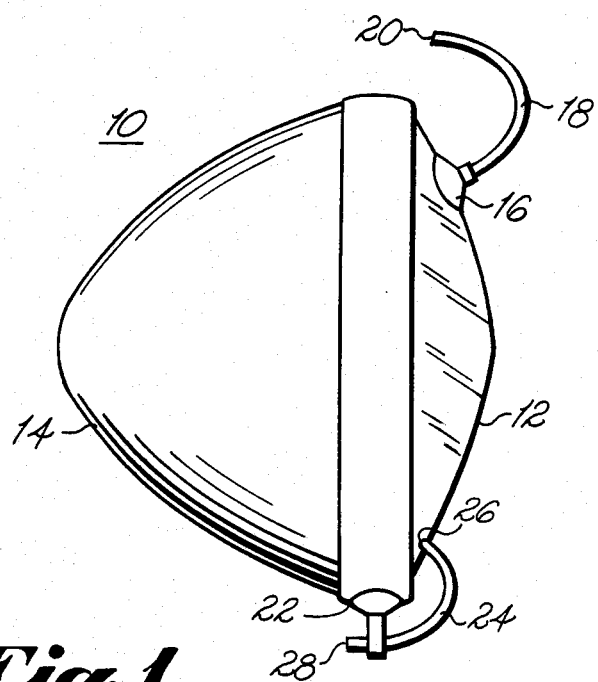
FIG. 1 is a side view of a motor vehicle headlight having two embodiments of light conveying conduits secured thereto.

In FIG. 1, motor vehicle headlight 10 is shown having lens 12 and housing 14 and is equipped with two embodiments of the invention. Suction cup 16 has been secured in the conventional manner directly on lens 12 near the edge of the lens. Suction cup 16 is made of transparent or translucent material so that at least some visible radiation passes through suction cup to one end of conduit or rod 18. Conduit or rod 18 is secured at one end to suction cup 16, as will be shown in more detail in FIG. 2. Conduit or rod 18 is formed of a transparent or translucent material such as glass or a plastic, e.g. Lucite which will, in the well known manner, refract most or all of the radiation which enters one end so that it will leave conduit or rod 18 at the opposite end. Conduit or rod 18 is bent in any convenient configuration so that end 20 will be in the field of view of the operator of the motor vehicle on which the headlight is mounted. Conduit or rod 18 may be a single fiber or composed of multiple fibers. Conduit or rod 18 in this embodiment is rigid.

Also, in FIG. 1 is shown a second embodiment of the invention, in which suction cup 22 is mounted on housing 14 of motor vehicle headlight 10. Conduit or rod 24 also made of a light conveying material and of rigid construction, is in this embodiment mounted so that its side is held by suction cup 22. End 26 of conduit or rod 24 is positioned so as to be in contact with lens 12, while end 28 of rod 24 is positioned in the field of view of the operator.

Figure 2:
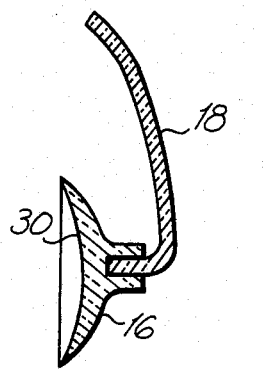
FIG. 2 is a cross-section of a preferred embodiment of a light conveying conduit with its suction cup support.

Turning to FIG. 2, suction cup 16 and conduit or rod 18 are shown in cross-section. As shown, both suction cup 16 and conduit or rod 18 are of transparent material. The inner surface of suction cup 16 may be polished using a mild abrasive paste applied with a rotary rubber applicator. Similarly, the ends of conduit or rod 18 may be polished. Conduit or rod 18 fits tightly in the cylindrical recess of suction cup 16 so that it will remain fixed in position.

Figure 3:
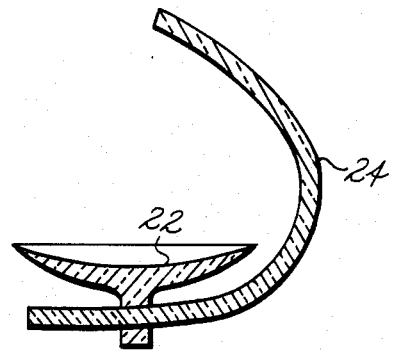
FIG. 3 is a cross-section of another embodiment of a light conveying conduit with its suction cup support.

FIG. 3 shows in cross-section the second embodiment of FIG. 1 having suction cup 22 and conduit or rod 24. Although suction cup 22 is cross-hatched for transparent material, in this embodiment it may be opaque as it need not transmit radiation. The passage in suction cup 22 through which conduit or rod 24 passes provides a tight fit so that conduit or rod 24 will remain in position.

Figure 4:
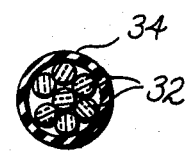
FIG. 4 is a cross-section of a light conveying conduit.

FIG. 4 shows an alternate embodiment of the light conveying conduit or rod. In this embodiment a plurality of fibers 32 are used to convey the radiation. Outer coating 34 has been applied, which may also be applied in a single fiber conduit or rod, for protection of the conduit or rod, and in the case of a multiple fiber conduit, to hold the fibers together.

Figure 5:
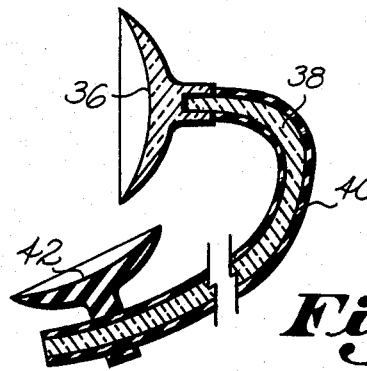
FIG. 5 is a cross-section of another embodiment of a light conveying conduit with two suction cup supports.

FIG. 5 shows suction cup 36 holding one end of conduit or rod 38, which may be flexible, and which has outer coating 40. A second suction cup 42 holds the side of conduit or rod 38. When conduit or rod 38 is flexible, second suction cup 42 permits positioning of the light emitting end of conduit or rod 38 as desired within the field of view of the operator. As is well known, light may be conveyed over long distances using light conveying conduits and rods, so that FIG. 5 does not represent a conduit or rod of any particular length.

Although suction cups have been shown in the representations of embodiments of the invention because they represent a readily used manner for supporting the light conveying conduit or rod, it will be apparent that other support means, such as transparent adhesives or tapes, may also be used. Also, although headlights of motorcycles and other motor vehicles may be more important uses of the present invention, it may also be used to observe the operation of a tail light of a motorcycle or other vehicle through a rearview mirror. It will be evident that other changes and modifications may be made without departing from the spirit of the invention or the scope of the appended claims.

I claim:

1. A motor vehicle light indicator comprising:
   a transparent, solid, light conveying conduit;
   a suction cup for holding one end of said light conveying conduit on said light to face the radiation of said light; and
   said conduit so configured that it bends through an angle of more than 90 degrees so that the other end of said conduit will be in the field of view of the operator of said motor vehicle.

2. A motor vehicle light indicator in accordance with claim 1 wherein:
   said one end of said light conveying conduit is mounted in the center of said suction cup.

3. A motor vehicle light indicator in accordance with claim 1 wherein:
   the side of said conduit is covered.

4. A motor vehicle light indicator in accordance with claim 3 wherein:
   said conduit is composed of a plurality of fibers.

5. A motor vehicle light indicator in accordance with claim 1 wherein:
   said suction cup is transparent.

6. A motor vehicle light indicator in accordance with claim 1 wherein:
   said suction cup is translucent.

7. A motor vehicle light indicator in accordance with claim 1 wherein:
   said conduit is formed of a plastic.

8. A motor vehicle light indicator in accordance with claim 7 wherein:
   said plastic is Lucite.

9. A motor vehicle light indicator in accordance with claim 1 wherein:
   the side of said conduit is mounted in said suction cup.

10. A motor vehicle light indicator in accordance with claim 1 wherein:
    said conduit is rigid.

11. A motor vehicle light indicator in accordance with claim 1 wherein:
    said conduit is flexible.

* * * * *